United States Patent [19]

Seymour

[11] 3,969,879
[45] July 20, 1976

[54] HAY ROLLING MACHINE WITH IMPROVED ROLL STARTING AND COMPRESSION MEANS

[75] Inventor: Shaun A. Seymour, New Holland, Pa.

[73] Assignee: Sperry Rand Corporation, New Holland, Pa.

[22] Filed: Apr. 1, 1975

[21] Appl. No.: 564,177

[52] U.S. Cl. .............................................. 56/341
[51] Int. Cl.² ........................................ A01D 39/00
[58] Field of Search ............................. 56/341–343

[56] References Cited
UNITED STATES PATENTS

| | | | |
|---|---|---|---|
| 3,534,537 | 10/1970 | Buchele | 56/341 |
| 3,650,100 | 3/1972 | Swan | 56/341 |
| 3,789,593 | 2/1974 | Best et al. | 56/341 |
| 3,792,574 | 2/1974 | Best | 56/341 |

*Primary Examiner*—Russell R. Kinsey
*Attorney, Agent, or Firm*—John R. Flanagan; Frank A. Seemar; Joseph A. Brown

[57] ABSTRACT

A machine for forming rolls of hay by rolling a swath of hay or the like along the ground into a coiled roll while the machine moves forwardly includes a supplemental frame movably mounting an endless apron which extends substantially vertically and has spring tines thereon to engage the hay upon the ground and elevate the same and moving it forwardly to form said coiled roll of hay on the ground and within the machine. The supplemental frame is also provided with forwardly extending finger means operable to facilitate directing the upwardly moving hay in a forward direction and thereby cause the same to be positively formed into a coiled roll, the fingers being adapted to be moved to inoperative position as the size of the roll of hay increases in diameter. The machine is also provided with roll compressing and confining structure disposed forwardly within the machine and supported for vertical pivotal movement about the forward end thereof and means operable to yieldably resist upward pivoting of the compression structure to cause it to engage and compress the roll as it is being formed within the machine.

15 Claims, 6 Drawing Figures

HAY ROLLING MACHINE WITH IMPROVED ROLL STARTING AND COMPRESSION MEANS

BACKGROUND OF THE INVENTION

The present invention may be considered to be primarily an improvement over the hay rolling machine comprising the subject matter of U.S. Pat. No. 3,792,574 issued to Albert M. Best and assigned to the same assignee as the present invention, and also over the hay rolling machines disclosed in U.S. Pat. No. 3,650,100 issued to Sherman S. Swan and in U.S. Pat. No. 3,763,636 issued to John W. Bliss.

Particularly, the patents to Best and Swan include a series of endless chains operable within a substantially vertical plane and including spring fingers which engage a swath or windrow of hay or the like while lying upon a field, said chains having one span movable vertically upward for engagement of the fingers thereon with the hay to elevate the same while the machine moves forwardly over the windrow which is being formed into a coiled roll of hay. In general, vertically extending stripping means are associated with the upwardly moving span of the endless chains to insure separation of the hay from the spring fingers and this operation generally results in forming a coiled roll of hay. In the Swan machine, the stripping means not only provide separation of the hay from the spring fingers, but also extend in a slightly forward inclined direction to give the hay a forward impetus which hopefully tends to throw the hay forwardly somewhat. It can be appreciated, however, that gravity is the principal force relied upon to cause the upwardly moving hay, as elevated by said chains and fingers, to move forwardly and downwardly into said coiled roll formation. But, in order to initiate formation of the coil of hay, the hay lying upon the ground must be moved forwardly and downwardly almost immediately after it is elevated from the ground and, thus, positive control over the movement of the hay is extremely important at this stage in roll formation. Unfortunately, the force of gravity offers no assurance that such degree of control will be provided over the hay movement at this initial stage. As a result, the stripping means referred to in said Best and Swan patents has not functioned in the maximum desirable manner which can be hoped for with respect to initiating the formation of a coiled configuration of the hay to form a roll thereof.

Also, the structures in the Best, Swan and Bliss patents for compressing the roll of hay as it is being formed do not effectively confine the coiling crop material and compact it to a desired level of density within the roll.

The features of the present invention disclosed hereinafter overcome the aforementioned difficulties of the Best and Swan hay rolling machines.

SUMMARY OF THE INVENTION

It is a principal object of the present invention to provide a durable and relatively simple hay rolling machine utilizing mechanical structures which require minimum maintenance and are capable of forming compact rolls of hay of substantial size by utilizing in a series of endless flexible means extending transversely across the rearward part of the machine considered in relation to the direction of movement thereof, said flexible means having tines thereon which engage the leading end of a windrow of hay and elevate the same from a substantially horizontal position into a vertical position, the principle improvement of the present invention comprising the addition of means which positively deflect the vertically moving material into a forward direction for depositing the same on top of the coiled hay being formed, the initial formation of the core of the coiled roll causing said leading end of the windrow to be deflected forwardly and then downwardly onto the horizontal mass of hay of the windrow, it being understood that this condition exists only momentarily in the instant when the machine first engages the leading end of a windrow of hay to form the same into a coiled roll.

It is another object of the invention to provide a series of forwardly extending hay-directing fingers which are supported by a supplemental frame which, in turn, is supported by a mobile frame of the machine, said supplemental frame also supporting said endless flexible means to which said tines are connected for purposes of engaging the hay and elevating the same, while the forwardly extending hay-directing fingers change the direction of upwardly moving hay to direct it forwardly and thereby positively cause the formation of a coiled configuration of hay constituting a roll thereof.

It is a further object of the invention to use endless chains interconnected by longitudinally spaced transverse bars which carry the tines and together constitute said endless flexible hay-elevating means on said supplemental frame, one span of said elevating means extending substantially vertically and being movable upwardly by drive means on the machine, said supplemental frame also supporting upwardly-extending spacedapart stripping members between which extend the spring tines of said elevating means and said forwardly extending hay-directing fingers being pivotally connected to said stripping members and supported thereby, said hay-directing fingers being provided with biasing means normally tending to extend said fingers forwardly but permitting the same to progressively be elevated about their pivots as the diameter of a coiled roll of hay increases to cause such pivoting movement of said fingers.

It is still another object of the invention to form said upwardly extending stripping members in the nature of channels having their open faces extending forwardly in said machine and said hay-directing fingers also comprising shorter sections of stiff channel means but the open face of said channel means extending upwardly and/or rearwardly, whereby the surfaces of said channel type fingers which engage the roll of hay as being formed comprise the connecting web of the channels between the flanges thereof, the flanges of said channels comprising said fingers being nested relative to the flanges of the upwardly extending stripping members, whereby bolts may be extended through said flanges of said fingers and members to effect a simple but a durable pivotal support and connection therefor and spring means may be provided around the pivot bolts for biasing the fingers to extend in a direction forwardly from said upwardly extending stripping members.

Still another object of the invention is to provide improved roll compressing and confining structure forwardly of the supplemental frame being supported at one end proximate the forward end of the mobile frame for vertical pivotal movement and means operable to yieldably resist upward pivotal movement of the structure to cause it to engage and compress the roll at least at a forward side thereof while at least a portion of the roll is being formed. The improved structure preferably comprises a pair of compressing rollers each respectively supported by separate pairs of arms, being pivotally mounted at the forward end of the mobile frame. The yieldable means is further operable to limit the downward movement of said rollers beyond a predetermined lower position in which the rollers are spaced a limited distance above the surface of a field over which the machine is operating, the yieldable means also having a shock-absorbing effect to prevent damage to the rollers and/or the machine.

Details of the foregoing objects and of the invention, as well as other objects thereof, are set forth in the following specification and are illustrated in the accompanying drawings comprising a part thereof.

DETAILED DESCRIPTION

Figure 1:
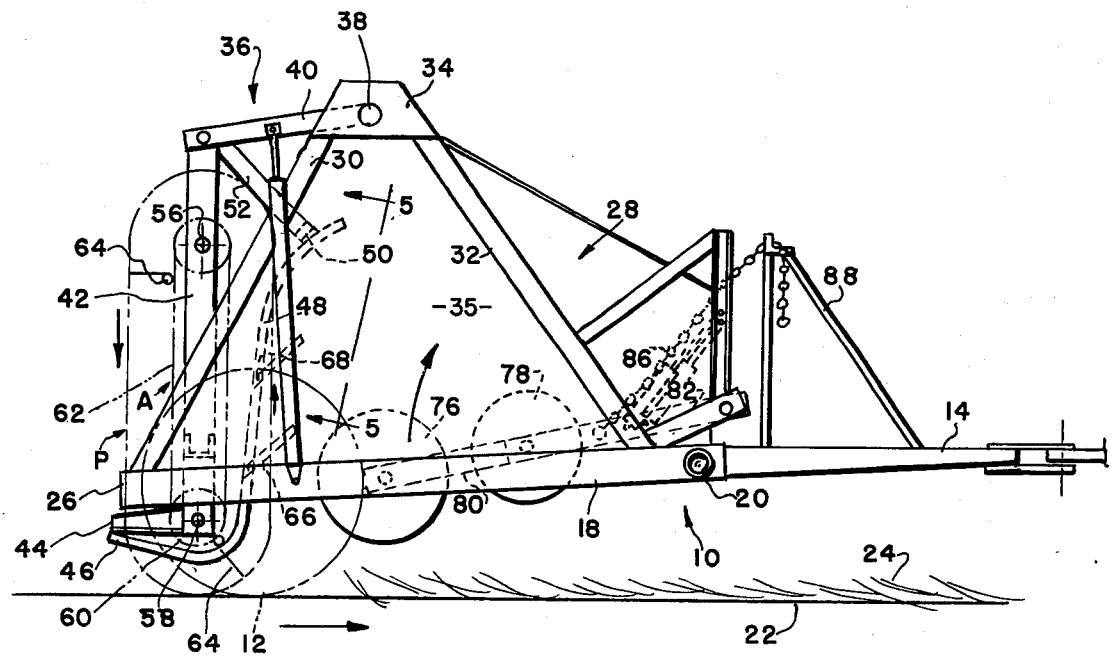
FIG. 1 is a side elevation of an exemplary hay roll forming machine embodying the principles of the present invention and showing certain elements of the machine substantially in the initial position thereof which they occupy when initially engaging a swath or windrow of hay to form the same into a coiled roll thereof.

Referring particularly to FIGS. 1–4, it will be seen that the hay rolling machine comprising the present invention consists of a mobile frame 10 having a pair of suitable wheels 12 mounted on opposite sides thereof and the forward end 14 of frame 10 being adapted to be coupled to a tractor or other means capable of propelling the machine along a field for purposes of coiling a swath or windrow of hay or other similar material into a roll of suitable density, diameter and length. It also is to be understood that the machine comprising the present invention not only is adapted to coil a roll of hay, such as used in the conventional agricultural vernacular, but also any other suitable crop materials, for example, those normally fed to livestock other than timothy hay, such as alfalfa and clover, and those often utilized to provide bedding material for livestock, such as oats straw and corn stalks.

The mobile frame 10 is of sufficient width to permit the formation of a roll 16 of hay or any other suitable crop material, it being understood that the term "hay" is used in the generic sense to include the various types of crop materials, such as those referred to above that are suitable to be fed to or used for bedding livestock. In common practice employed at present, such rolls are of the order of as much as 6 feet in length and 4 feet or 5 feet or more in diameter. It will be understood that the frame 10 is composed of a pair of similar opposite side members 18, the forward ends of which are suitably connected by transverse frame member 20 from which the forward end 14 extends somewhat in the nature of a tongue. It is intended that the machine be moved forwardly along a field in the direction of the arrow shown immediately below the field surface 22 in FIGS. 1–4, upon which a swath or windrow of hay 24 or the like is disposed and the object of the machine being to coil the same into a roll 16 of suitable density. The rear end 26 of the mobile frame 10 is the discharge end thereof and the same has no interferring transverse connecting member in order that a completed roll 16 of hay may be moved through said open end of the frame 10 or, conversely, in order that the machine may be moved forwardly from the completed roll 16 and leave the same lying in the field where it was formed or, otherwise, the roll may be transported to any other suitable location.

Figure 2:
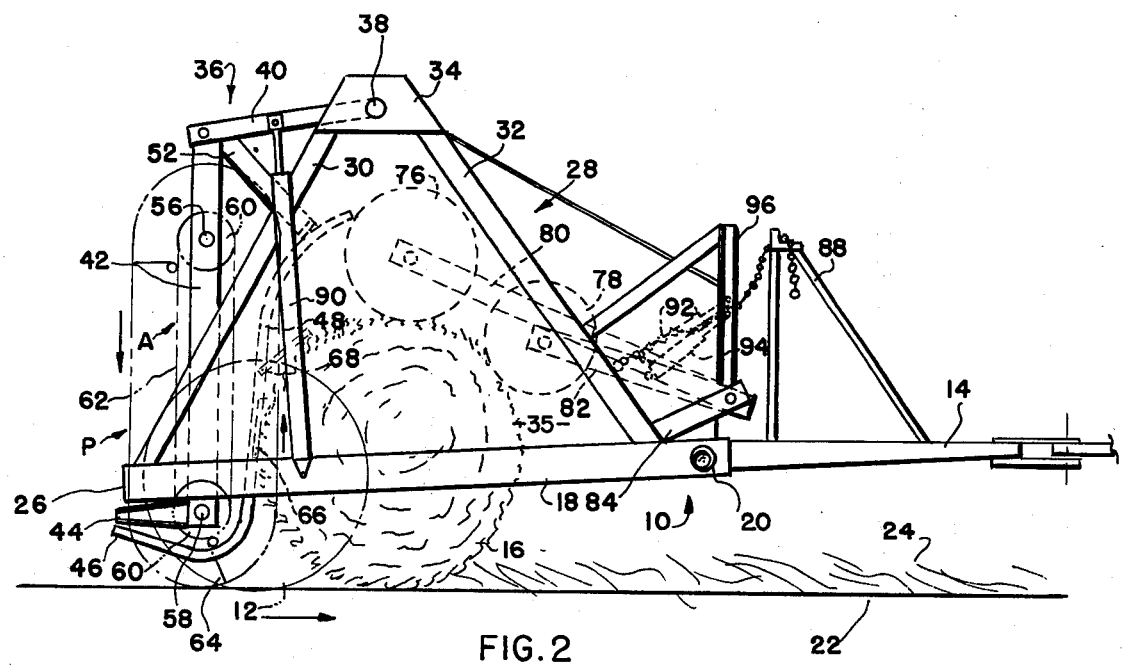
FIG. 2 is a view similar to FIG. 1 but showing certain advanced positions of some of the roll-forming elements of the machine illustrated in relation to a partially formed coiled roll of hay.
Figure 3:
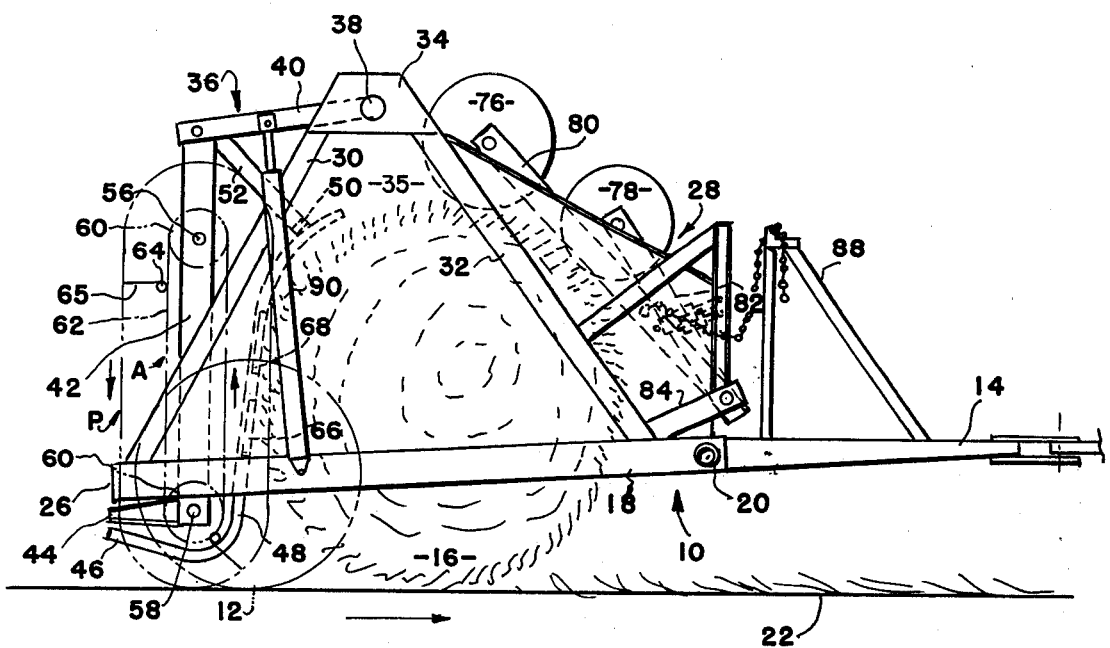
FIG. 3 is a view similar to FIGS. 1 and 2 but illustrating the relative positions of certain of the roll-forming elements of the machine in which they are disposed substantially at the time of forming a roll of hay of approximately maximum diameter immediately prior to the same being discharged from the machine.
Figure 5:
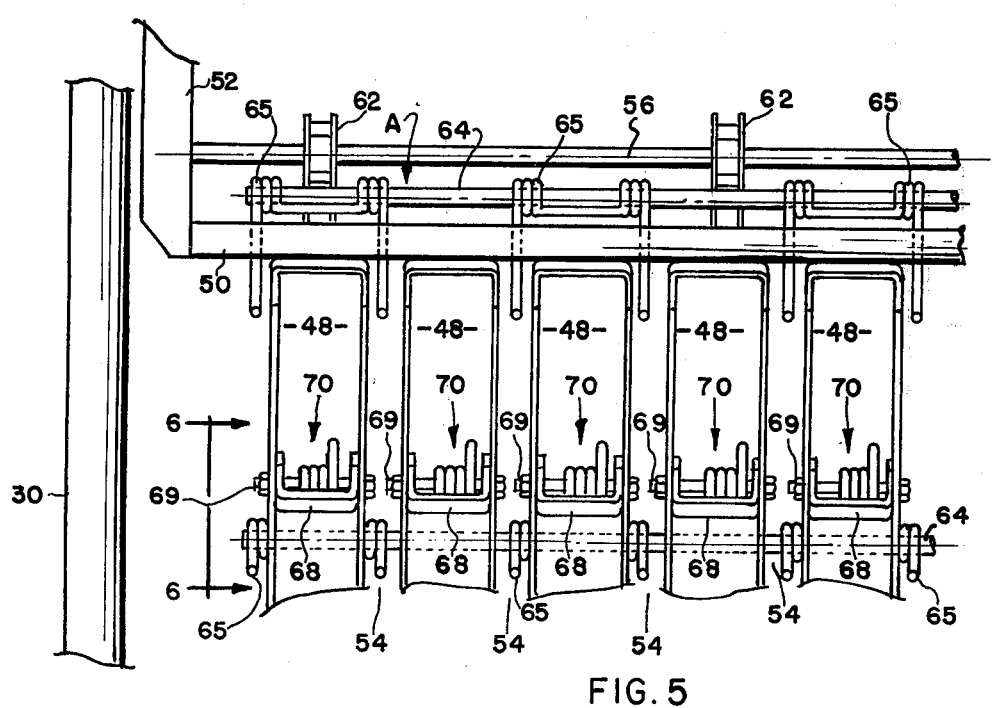
FIG. 5 is a fragmentary, enlarged elevation showing the hay-directing fingers of the machine in operative relation to vertically extending means by which they are supported.

Extending upwardly from the side members 18 of frame 10 are similar triangular shaped frames 28 comprising a pair of suitable rigid members 30 and 32 which are connected at the lower ends thereof to the side members 18 and extend angularly upward toward each other for connection to a suitable head member 34. Also, each of the frames 28 includes a side sheet 35 which is fixed about its periphery to, and extends between members 18, 30, 32 and 34 of each frame 28. The principle purpose of the triangular frames 28 is to support a supplemental frame 36 which is pivotally connected to a suitable transverse axis member 38 which extends between the head members 34 at opposite sides of the frame 10. The supplemental frame 36 comprises rearwardly extending upper members 40 from the respective rear ends of which, downward extending members 42 project and, preferably, normally are substantially vertical in the operative position thereof which is shown in FIGS. 1–3. The lower ends of members 42 have rearwardly extending arms 44 connected thereto and a cross member (not shown) extends transversely between the outer ends of the rearwardly extending arms 44 for purposes of having connected thereto the lower rearward ends 46 of a transversely spaced series of stripping members 48, the upper ends of said stripping members being curved forwardly relative to the direction of movement of the machine along a field. Said upper ends of members 48 are connected to another transverse member 50, best shown in FIG. 5, which extends between a pair of rigid arms 52 which extend downwardly and forwardly in the operative position from upper members 40 of supplemental frame 36. Referring to FIG. 5 in particular, it will be seen that the stripping members 48 preferably comprise channels which are separated by intermediate spaces 54, for purposes to be described. The open faces of the channels comprising the stripping members 48 are disposed forwardly, also for purposes to be described.

Supplemental frame 36 supports a pair of vertically-spaced, horizontally-extending shafts 56 and 58 upon which are fixedly mounted a series of sprockets 60 around which a corresponding series of endless flexible members 62, preferably comprising endless chains, extend for support. As shown in FIG. 5, the members 62 are interconnected by longitudinally spaced transverse bars 64 which each support a series of spring tines 65. The tines 65 in each series thereof are spaced from each other along the length of the corresponding transverse bar 64. The outwardly-projecting spring tines 65 carried on the bars 64 extend forwardly through the spaces 54 between the stripping members 48 as shown in FIG. 5.

The flexible members 62, the transverse bars 64 which interconnect the members 62 and the tines 65 carried on the bars 64 constitute an elevating means in the form of an endless flexible pick-up and roll-forming apron A which moves in generally counterclockwise direction upon rotation of sprockets 60. Thus, as the mobile frame 10 is moved along the field in alignment with a windrow of hay, the tines 65 of the apron A continuously elevate hay from the field.

Any suitable means, not shown, may be employed to operate, for example, the shaft 56 by which all of the sprockets 60 and the endless flexible members 62 of the apron A are driven. The opposite spans of the flexible members 62 move in the generally counterclockwise direction of the arrows shown in FIG. 1-3, it being seen that the innermost or forward span of the apron A moves vertically upward with the spring tines 64 moving upward between the spaced stripping members 48. Because of the forwardly curved upper portions of the members 48 projecting a substantial distance in that direction beyond a path P defined by the outer tips of the spring tines 65 as the apron is moved, it readily can be visualized that hay and the like, being continuously elevated by the tines on at least the lower portion of the upwardly moving innermost span of the apron, is stripped from said tines as the path of the tines 65 progressively converges with the forward faces of the stripping members 48.

It can be visualized that merely relying upon the stripping effect of the members 48 to free hay and the like being elevated by the tines on the upwardly moving span of the apron A to cause the stripped hay to be formed into a coiled roll may be inadequate to accomplish such coiling, particularly in the initial stages of such coiling operation of a roll of hay 16 which is being duly formed. Accordingly, one of the principle improvements afforded by the present invention comprises additional means to positively insure that the hay being moved upwardly by the tines 65 of the endless apron A will be directed forwardly in a direction to insure the formation of such a coiled roll, this being achieved by means now to be described.

It is to be understood that the flexible members 62 of the apron A are driven in the manner described above by suitable means, not shown, such as by appropriate sprockets and sprocket chain interposed between one of the wheels 12 and the upper shaft 56. For details of such suitable drive means, attention is directed to corresponding drive means illustrated and described in said aforementioned U.S. Pat. No. 3,792,574. Referring to FIG. 1, wherein is depicted an exemplary initial stage of the formation of a coiled roll of hay by the hay rolling machine engaging one end of a windrow 24 of hay for example, it will be seen that the stripping members 48 each support, preferably, a pair of similar hay-directing fingers 66 and 68, the fingers 66 comprising a lower series thereof and the fingers 68 comprising an upper series of the same. For purposes of simplifying the illustration, by reference to FIG. 5, it will be seen that only the upper series of fingers 68 are illustrated but it is to be understood that the lower series of fingers 66 are similar thereto. Therefore, the description of fingers 68 which follows hereinafter will also apply to fingers 66. Especially as shown in FIG. 1, it will be seen that the normal, initial position of the fingers 66 and 68 is one in which they principally extend forwardly but also somewhat upwardly. Considering the position of the lower series of fingers 66 shown in FIG. 1, it can be appreciated that as the spring tines 64 move around the lower sprocket 60, they will engage hay of the windrow 24 and carry the same upwardly until said hay engages said lower series of hay-directing fingers 66 which will deflect said hay in a forward direction and operate, in effect, somewhat as a cam means to move the initially engaged part of the windrow of hay positively in a coiling direction. The fingers 66, in effect, act as lower extensions of the stripping members 48, which co-operate with the stripping members 48 to effectively strip the hay from the tines 65 during the initial stage of roll formation.

Figure 6:
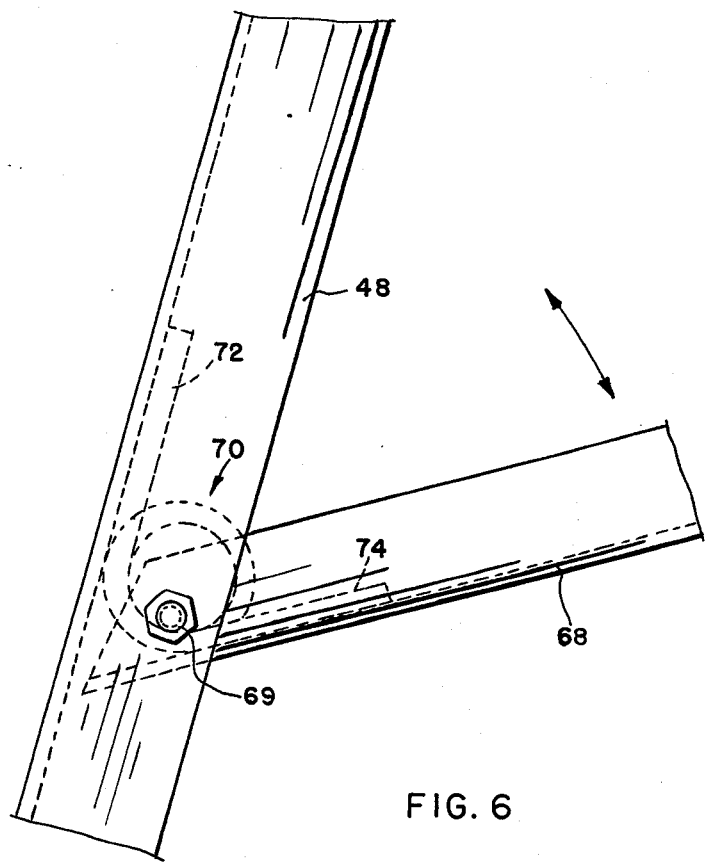
FIG. 6 is a further enlarged fragmentary side elevation showing details of the mechanism shown in FIG. 5 as seen on the line 6—6 thereof.

Referring to FIGS. 5 and 6, it will be seen that the flanges of the channel members comprising the hay-directing fingers 68 are nested between the flanges of the channel shaped stripping members 48. Said flanges respectively are formed with aligned holes through which pivot bolts 69 extend to securely connect the hay-directing fingers to the stripping members 48 not only for support thereby but also to permit effective pivotal movement of the fingers 66 and 68 relative to stripping members 48 when the size of the roll of hay 18 increases in diameter sufficiently to force, first, the lower series of hay-directing fingers 66 into substantially upright position, as shown in exemplary phantom manner in FIG. 2 and, ultimately, it can be appreciated that when, for example, the roll of hay 16 has reached substantially maximum diameter as illustrated in exemplary manner in FIG. 3, the upper series of hay-directing fingers 68 likewise will be moved into upright position. It should be noted incidentally from FIG. 5 that the outermost surfaces of the channel-shaped fingers 68 comprise the smooth connecting web of the channel, said webs being of appreciable width. Further, the hay-directing fingers 66 and 68 are normally urged toward their forwardly extending position such as illustrated in exemplary manner in FIGS. 1 and 6, by appropriate spring means such as spring 70 which comprise a limited number of coils which extend around the pivot bolts 69 and the opposite ends 72 and 74 thereof respectively bear upon the connecting webs of the channel-shaped stripping members 48 and hay-directing fingers 66 and 68. The springs 70 preferably are of sufficient strength to permit the fingers 66 and 68 to exert a limited amount of pressure upon the coiled roll of hay 18 while it is being rolled along the field 22 by engagement of the tines 65 with the outer surface of the lower rearward portion of the roll 16.

The present invention also includes a further improvement in the nature of roll compacting and confining rollers. In the preferred construction, a pair of such rollers 76 and 78 are employed, the same having a length substantially equal to the length of the roll of hay 16 being formed by the machine. Said rollers are supported upon appropriate shafts extending between pairs of arms 80 and 82, one end of said arms being connected to said shafts which are clearly shown in FIGS. 1-3 and the opposite ends of the arms are pivotally connected to the outer end of stub frame members 84 which are fixed to the opposite side members 18 of the mobile frame 10. The rollers 76 and 78 may operate upon the roll due to gravity in that they may be constructed so as to be of appreciable weight which is adequate to exert a desired amount of pressure upon the roll of hay 16 so as to compact the same to a limited extent and impart substantially uniform density to the roll 16 throughout the entire mass thereof. However, preferably, extensible and retractable devices, which function as a spring resisting retraction thereof, are coupled to respective arms 80,82, which mount the rollers 76,78, and apply a preselected downwardly-directed pressure thereto to resist pivoting of the arms 80,82 from their FIG. 1 to their FIG. 3 position. In such preferred manner, a desired amount of pressure is imposed upon the roll of hay by the rollers 76,78 to compress the same to a desired level of density as it is being formed by the machine.

The rollers 76 and 78, as illustrated, are free-wheeling with respect to the arms 80 and 82 and are rotated counterclockwise as the roll of hay 16 rolls along the field during its formation. Alternatively, the rollers 76 and 78 may be powered by suitable drive means, such as a chain and sprocket assembly drivingly coupled to one of the rear wheels 12 or to the tractor power take-off.

Referring to FIG. 1, it will be seen that the rollers 76 and 78 are illustrated in an exemplary lowermost position thereof, which position is maintained by any suitable means such as chains 86 at opposite sides of the mobile frame 10, one end of the chains 86 preferably being connected to the arms 80 and 82 and the opposite ends being adjustably attached to upwardly extending support means 88 fixed to the forward end 14 of the mobile frame 10 in any appropriate manner.

As seen in FIG. 1, the primary one of the rollers, that being the rearmost one indicated by 76, cooperates with the apron A and the lower fingers 66 to assist in the initial formation of the hay roll core. During the period of initial roll formation, the primary roller 76 engages the coiling hay generally along a forward side thereof. As the roll grows toward the intermediate size thereof illustrated in FIG. 2, the primary roller 76 gradually rises from the forward side to the upper side of the hay roll. Also, the secondary one of the rollers, that being the forwardmost roller 78, then cooperates with the primary roller 76, the apron A and stripping members 48 to assist in continued formation of the hay roll. The secondary roller 78 now engages the coiling hay generally along its forward side and maintains such engagement as the hay roll grows toward its final size as illustrated in FIG. 3. In such manner, the primary roller 76 during the period of initial roll formation and both the primary and secondary rollers 76,78 during the remaining period of roll formation compress the coiling hay and assist in confining or retaining the hay being continuously added to the roll and thereby provide improved control thereof during the continuous growth in size of the roll.

Figure 4:
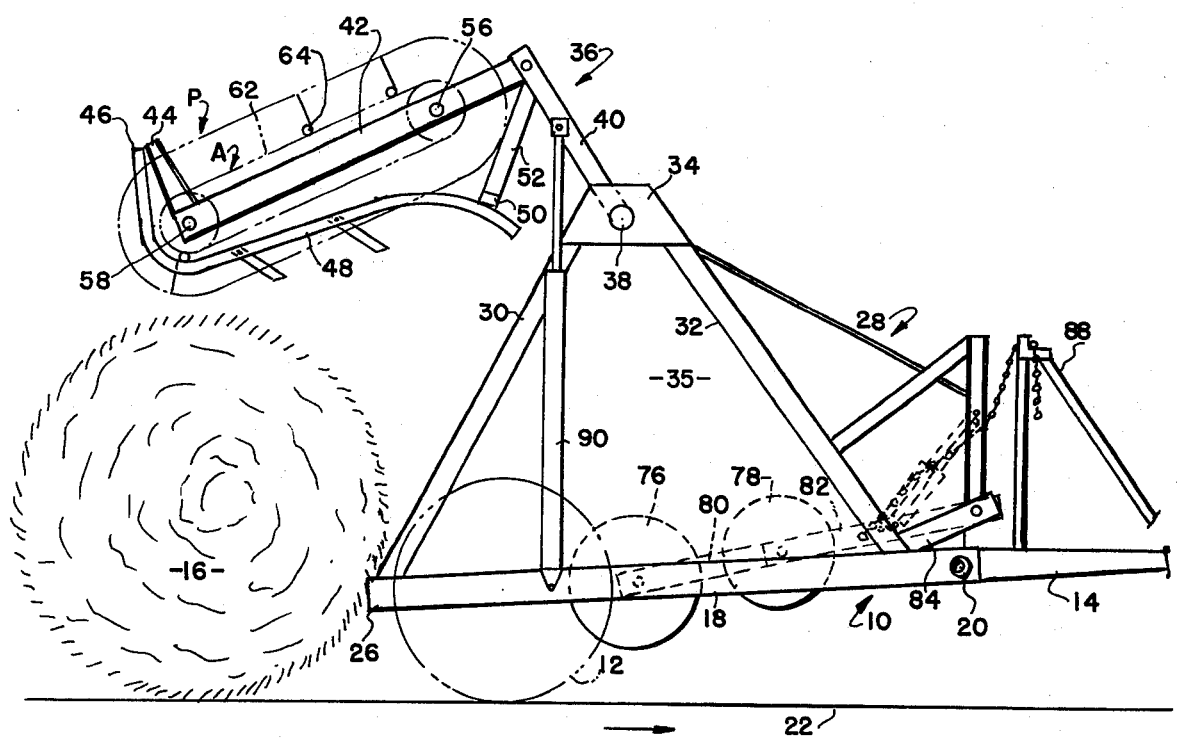
FIG. 4 is a view similar to FIG. 3 but showing the coiled roll of hay in process of being discharged from the machine.

When the roll of hay 16 has been formed to a desired diameter, such as illustrated in exemplary manner in FIGS. 3 and 4, the roll is discharged from the rearward end of the mobile frame 10 or, rather, the mobile frame 10 is permitted to move forwardly from the roll 16 and leave the same rest upon the field 22. Such discharge is effected, for example, by the operator of the tractor which propels the machine over the field 22 operating appropriate valve means of conventional type carried by such tractor, not shown, which causes hydraulic fluid, not shown, to be forced from a reservoir thereof on the tractor into one end of each of a pair of hydraulic cylinder units 90, being connected at the lower ends thereof to the side frame members 18 of the frame 10 and at the outer ends of the piston rods of said units being pivotally connected to the upper members 40 of the supplemental frame 36, intermediate of the ends of the members 40, with the piston rods of the units 90 thereby being extended to raise the entire supplemental frame 36 and all of the mechanism of the machine supported thereby to the exemplary discharge position illustrated in FIG. 4. The machine and the completed roll of hay 16 then are separated and the machine moves forwardly for purposes of forming another roll of hay for example. This is accomplished by retracting the piston rods of the units 90 to thereby lower the auxillary frame 36 and the mechanism carried thereby to the initial starting position shown for example in FIG. 1.

The aforementioned extensible and retractible devices, indicated by 92 and 94, in addition to their pressure spring function which resists retraction thereof, also function as shock-absorbers upon extension thereof. Therefore, the devices 92 and 94, being connected between brace 96 fixed on frame 10 and the arms 80 and 82, limit the rate of downward movement of the arms and the rollers mounted thereto in order to protect the rollers and the arms, as well as frame structure associated therewith, from being damaged in any way when the rollers are disengaged from the hay roll 16 upon discharge thereof from the machine.

While the invention has been described and illustrated in its several preferred embodiments, it should be understood that the invention is not to be limited to the precise details herein illustrated and described since the same may be carried out in other ways falling within the scope of the invention as illustrated and described.

Having thus described the invention, what is claimed is:

1. In a machine of the type adapted to form a swath or windrow of hay or other suitable crop material lying upon a field into a roll thereof by rolling the same along the field until a roll of predetermined size is formed and including a mobile frame being open at the bottom thereof and adapted to be moved along the field, supplemental frame means carried by said mobile frame at a rearward end thereof and endless flexible means movably mounted by said supplemental frame means and having hay engaging means which, upon movement of said flexible means, elevate said windrow of hay and engage said roll thereof as formed to rotate said roll of hay forwardly within said mobile frame; the improvement comprising a lower transverse series of hay-directing fingers supported by said supplemental frame means in spaced relation above the field and extending forwardly therefrom for engagement with hay being elevated by said hay engaging means and operable to strip the hay therefrom and direct the same forwardly in a roll-forming direction at least during an initial period in the formation of a roll thereof, said fingers being adapted to yield and move upwardly from their initial forwardly extending positions as the diameter of said roll increases as formed within said mobile frame.

2. The machine according to claim 1 in which said endless flexible means comprises a series of substantially parallel endless flexible members, said hay engaging means being carried by said members at longitudinally spaced positions therealong and projecting outwardly therefrom, and said supplemental frame means rotatably supporting a pair of horizontally-extending means in vertically spaced relationship around which said flexible members extend; the hay-directing fingers which comprise said improvement extending forwardly from said supplemental frame means and beyond said outwardly projecting hay engaging means.

3. The machine according to claim 1 in which said improvement further comprises a higher transverse series of hay-directing fingers supported by said supplemental frame means in spaced relation above said lower series of fingers and extending forwardly from said supplemental frame means and operable to engage hay being elevated by said hay engaging means, strip the hay therefrom and direct the same forwardly in said roll-forming direction at least during another period in the formation of a roll thereof subsequent to said initial period, said higher fingers being adapted to yield and move upwardly from their forwardly extending positions as the diameter of said roll further increases as formed within said mobile frame.

4. The machine according to claim 1, further including means to elevate said supplemental frame means, and said endless flexible means and said lower series of fingers therewith, with respect to said mobile frame to permit removal of a formed roll of hay rearwardly of said mobile frame.

5. The machine according to claim 1 in which said endless flexible means comprises a series of substantially parallel, vertically-extending endless flexible members and said hay engaging means of said endless flexible means comprises a plurality of transverse members longitudinally spaced apart along and interconnecting said endless members and a series of tines supported by each of said transverse members, said tines in each series thereof spaced from each other along the extent of said each transverse member and projecting outwardly therefrom.

6. The machine according to claim 5 in which said supplemental frame means includes a series of hay-stripping members in the form of elongated members extending from a position closely above the field to an elevation proximate the final diameter of said roll of hay as formed within said mobile frame, respective lower ends of said stripping members being disposed more rearwardly than respective upper ends thereof which extend forwardly beyond said outwardly projecting crop material engaging tines to insure stripping of hay therefrom as the diameter of said roll of hay increases after said lower hay-directing fingers have yielded upwardly, said tines being supported by said transverse members so as to outwardly project between adjacent ones of said stripping members and each of said lower fingers being pivotally connected to one of said stripping members intermediately of said ends thereof and projecting forwardly from said one stripping member and beyond said outwardly projecting tines at least during said initial period in the formation of said roll.

7. The machine according to claim 6 in which each of said stripping members comprises a channel having a pair of forwardly projecting, laterally spaced apart side flanges, an end of each of said hay-directing fingers being disposed respectively between said pair of side flanges of one of said stripping members, and means privotally securing said each finger end to said pair of side flanges of said one stripping member.

8. The machine according to claim 7 in which spring means is operably associated with said each finger end and corresponding stripping member to normally bias said each finger toward said forwardly extending position thereof, whereby said each finger yieldably engages said roll of hay being formed with sufficient firmness to effectively direct hay being elevated thereto by said tines onto said roll in said forward roll-forming direction.

9. The machine according to claim 1 in which said improvement further comprises structure supported at one end proximate a forward end of said mobile frame for generally vertical pivotal movement and extending rearwardly therefrom and transversely in said mobile frame forwardly of said supplemental frame means and said endless flexible means being mounted thereon, and means interconnecting said structure and said mobile frame and operable to dispose said structure in a position adjacent at least a forward side of said roll of hay while being formed within said mobile frame and to yieldably resist upward pivoting of said structure and thereby cause engagement thereof with said forward side of said roll to confine and compress the same at least while a portion thereof is being formed within said mobile frame.

10. The machine according to claim 9 in which said interconnecting means is further operable to limit downward movement of said structure to a predetermined level above the field.

11. The machine according to claim 1 in which said improvement further comprises roll compressing and confining means extending transversely of said mobile frame forwardly of said supplemental frame means and said endless flexible means being mounted thereon, means pivotally supported at one end proximate a forward end of said mobile frame and extending rearwardly in said mobile frame to an opposite end which supports said compressing and confining means adjacent at least a forward side of said roll while being formed within said mobile frame, and means interconnecting said pivotal means and said mobile frame and being operable to dispose said compressing and confining means in a position generally adjacent at least said forward side of said roll of hay while being formed within said mobile frame and to yieldably resist upward movement of said compressing and confining means to cause engagement thereof with at least said forward side of said roll to compress and confine the same at least while a portion thereof is being formed within said mobile frame.

12. The machine according to claim 11 in which said interconnecting means is further operable to limit downward movement of said compressing and confining means to a predetermined level above the field.

13. The machine according to claim 11 in which said compressing and confining means comprises roller means rotatably supported by said pivotal means.

14. The machine according to claim 13 in which said roller means comprises a pair of rollers rotatably supported by said pivotal means in spaced apart relationship in the direction of movement of said mobile frame.

15. The machine according to claim 14 in which said pivotal means comprises separate pairs of arms each being pivotally connected at respective one ends thereof proximate said forward end of said mobile frame and extending rearwardly in said mobile frame to respective opposite ends which rotatably support opposite ends of one of said pairs of rollers.

* * * * *